Figure 2:
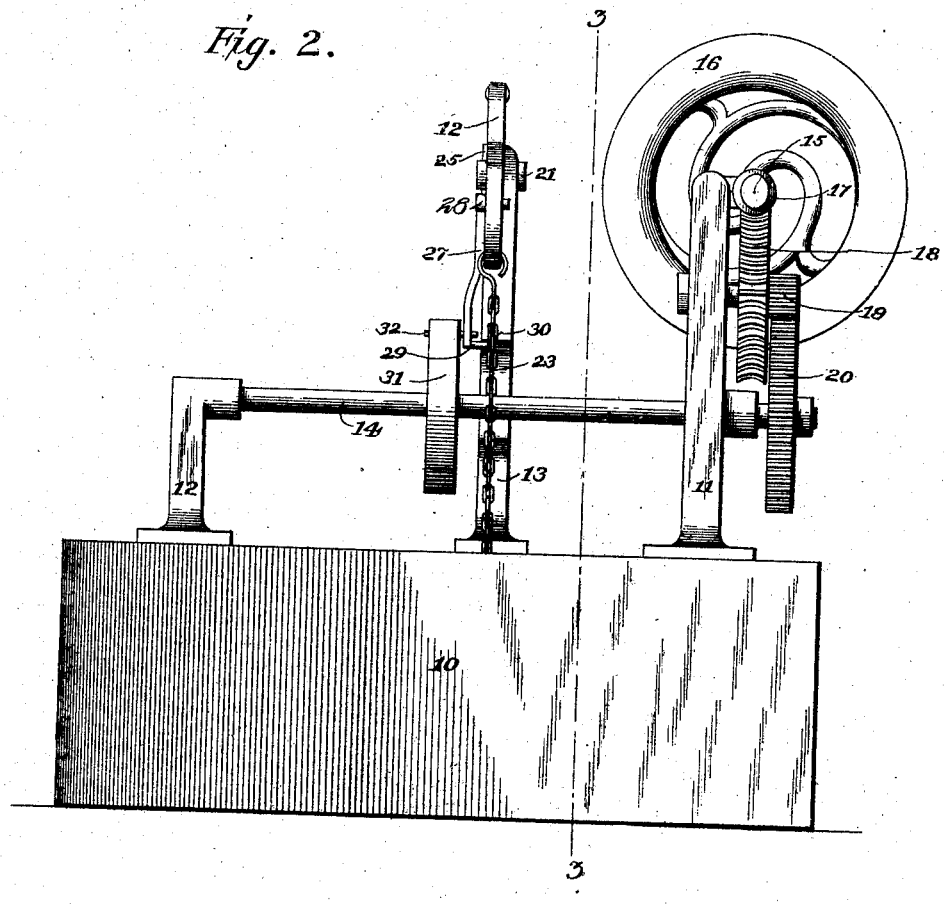

No. 846,470. PATENTED MAR. 12, 1907.
J. H. HERMANCE.
TIME CONTROLLED MECHANISM.
APPLICATION FILED JUNE 30, 1906.
2 SHEETS—SHEET 1.
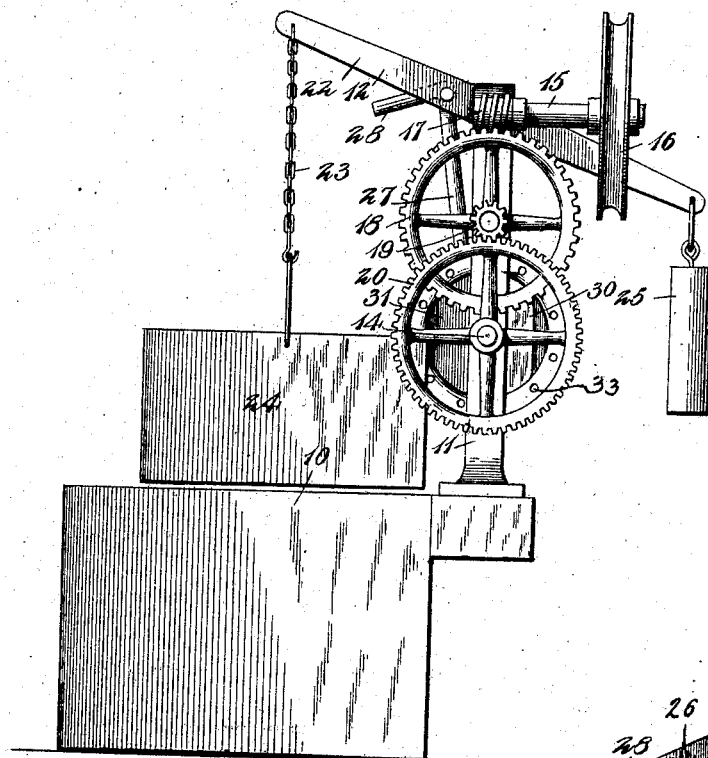
Fig. 1.
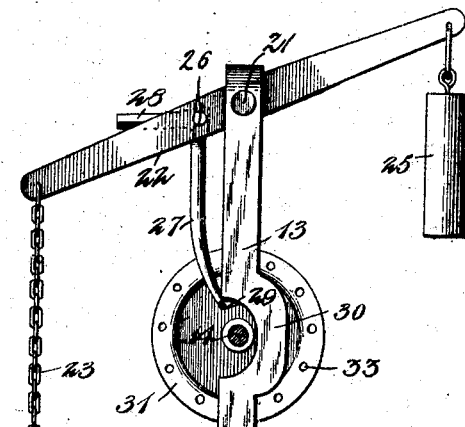
Fig. 3.
Witnesses
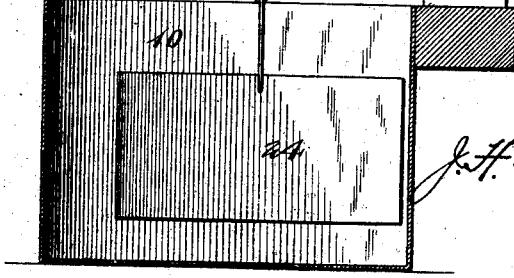
J. H. Hermance
Inventor
By Milo B. Stevens & Co.
Attorneys No. 846,470. PATENTED MAR. 12, 1907.
J. H. HERMANCE.
TIME CONTROLLED MECHANISM.
APPLICATION FILED JUNE 30, 1906.

2 SHEETS—SHEET 2.

UNITED STATES PATENT OFFICE.

J HENRY HERMANCE, OF HOT SPRINGS, ARKANSAS.

TIME-CONTROLLED MECHANISM.

No. 846,470.  Specification of Letters Patent.  Patented March 12, 1907.

Application filed June 30, 1906. Serial No. 324,192.

*To all whom it may concern:*

Be it known that I, J HENRY HERMANCE, a citizen of the United States, residing at Hot Springs, in the county of Garland and State of Arkansas, have invented new and useful Improvements in Time-Controlling Mechanism, of which the following is a specification.

This invention is a time-controlling mechanism, and more particularly an apparatus for boiling eggs or other food articles for a predetermined length of time.

The invention comprises a receptacle containing the eggs or other food articles which are immersed in boiling water and after a predetermined length of time automatically removed therefrom.

In the accompanying drawings, Figure 1 is an end view of the apparatus with the receptacle in elevated position. Fig. 2 is a front elevation. Fig. 3 is a transverse vertical section on the line 3 3 of Fig. 2 with the receptacle immersed.

Referring specifically to the drawings, 10 denotes a tank which when filled with boiling water receives a receptacle containing the eggs or other food articles to be cooked. Rising from the rear edge of the tank are standards 11, 12, and 13. The standards 11 and 12 have bearings for a horizontally-disposed shaft 14. The standard 11 also has a bearing in which a worm-shaft 15 is journaled, said shaft having a drive-pulley 16, which will be connected by a belt to any suitable motor. The worm 17 meshes with a worm-wheel 18, mounted on the standard 11. The shaft of the worm-wheel 18 has a pinion 19, which meshes with a spur-wheel 20 on the shaft 14. These parts constitute a reducing-gear for driving the shaft 14 at a slow and uniform rate of speed.

At the top of the standard 13 is pivoted, as at 21, a lever 22, one end of which overhangs the tank and from which end is suspended, by means of a chain 23, a receptacle 24. The opposite end of the lever carries a weight 25.

To that end of the lever which carries the receptacle 24 is pivoted, as at 26, a detent comprising angularly-disposed arms 27 and 28, respectively. The arm 27 has a finger 29, which engages a recess 30 in the standard 14. The weight of the arm 28 serves to hold the hook 29 in engagement with the knob 30.

At 31 is indicated a disk which is made fast to the shaft 14 adjacent the standard 13. From one side of the disk extends a pin 32, which is arranged in the path of the detent to disengage the same. The disk has a number of holes 33, into any one of which the pin 32 may be stuck so that the length of time the receptacle is to remain in the tank can be varied.

In use the tank 10 is filled with boiling water, and the eggs or other food articles are placed in the receptacle 24, which is then lowered into the tank by swinging the front end of the lever 22 downwardly. The finger 29 is then placed into the recess 30, which holds the lever down and prevents it from being lifted by the weight 25. The pin 32 will be adjusted on the disk 31 according to the length of time it is desired that the eggs or other articles are to boil. The openings in the disks are preferably arranged so that the distance between each represents one minute of time. Thus if the receptacle is to remain in the tank for three minutes the pin will be placed in the third opening from the detent. Upon starting up the motor the disk will be rotated by the shaft 14. The pin 32 having been set as stated reaches the detent in three minutes and disengages it, which releases the lever and permits the weight 25 to swing it up, and thus raise the receptacle out of the tank.

The apparatus herein described is simple in construction, and therefore not liable to get out of order, and it is efficient and reliable in operation. The capacity of the apparatus can be increased by employing additional receptacles and means for actuating the same.

I claim—

1. The combination with a tank, of a vertically-swinging lever pivoted adjacent the tank, a receptacle carried on one end of the lever and extending into the tank when said end is lowered, a detent for holding the lever in lowered position, means for lifting the lever when the detent is released, a rotatable disk carrying a pin engageable with the detent for releasing the same, and means for actuating the disk to release the detent at a predetermined time.

2. The combination with a tank, of a vertically-swinging lever pivoted adjacent the tank, a receptacle carried on one end of the lever, and extending into the tank when said end is lowered, a detent for holding the lever in lowered position, means for elevating the lever when the detent is released, a rotatable disk, a pin carried by the disk and adjustable thereon, and engageable with the detent for releasing the same, and means for actuating the disk to release the detent at a predetermined time.

3. The combination with a tank, of a vertically-swinging lever pivoted adjacent the tank, a receptacle carried on one end of the lever, and extending into the tank when said end is lowered, a detent for holding the lever in lowered position, means for elevating the lever when the detent is released, a rotatable disk having a plurality of openings, a pin extensible into one of said openings, and engageable with the detent for releasing the same, and means for actuating the disk to release the detent at a predetermined time.

4. The combination with a tank, of a standard adjacent the same, a vertically-swinging lever pivoted to the standard and having at one end a weight, a receptacle carried on the other end of the lever, and extending into the tank when said end is lowered, a detent pivoted to the lever and engageable with the standard for holding the lever in lowered position, and means for releasing the detent at a predetermined time.

In testimony whereof I have signed my name to this specification in the presence of two subscribing witnesses.

J HENRY HERMANCE.

Witnesses:
E. A. NICKELS,
G. W. NICKELS.